United States Patent

Nishigaki et al.

[11] Patent Number: 5,263,483
[45] Date of Patent: Nov. 23, 1993

[54] BEAM FORMER FOR ULTRASONIC DIAGNOSTIC APPARATUS

[75] Inventors: Morio Nishigaki, Fujisawa; Hiroshi Fukukita, Tokyo; Hisashi Hagiwara, Yokohama, all of Japan

[73] Assignee: Matsushita Electric Industrial Co., Ltd., Osaka, Japan

[21] Appl. No.: 977,185

[22] Filed: Nov. 16, 1992

[30] Foreign Application Priority Data

| Nov. 20, 1991 | [JP] | Japan | 3-304405 |
| Nov. 20, 1991 | [JP] | Japan | 3-304407 |
| Nov. 20, 1991 | [JP] | Japan | 3-304408 |
| Nov. 20, 1991 | [JP] | Japan | 3-304409 |

[51] Int. Cl.$^5$ ............................................. A61B 8/00
[52] U.S. Cl. ........................... 128/660.01; 128/661.01; 367/103; 367/105
[58] Field of Search ............ 128/660.01, 660.07, 128/661.01, 661.08; 367/103, 105

[56] References Cited

U.S. PATENT DOCUMENTS

| 4,318,413 | 3/1982 | Iinuma et al. | 128/661.01 |
| 4,492,235 | 1/1985 | Sitrick | 128/705 |
| 4,841,491 | 6/1989 | Kondo et al. | 128/661.01 |
| 5,197,477 | 3/1993 | Peterson et al. | 128/661.08 |

FOREIGN PATENT DOCUMENTS

| 0335577 | 10/1989 | European Pat. Off. | 128/660.01 |
| 0361264 | 4/1990 | European Pat. Off. | 128/660.01 |
| 0430093 | 6/1991 | European Pat. Off. | 128/660.01 |

OTHER PUBLICATIONS

Dan E. Dudgeon, "Fundamentals of Digital Array Processing", Proceedings of the IEEE, vol. 65, No. 6, Jun. 1977, pp. 898-904.
R. Fehr, "A New MTI Structure with Inherent Analog to Digital Conversion", Circuit Theory and Design 1978, pp. 528-532.

Primary Examiner—Francis Jaworski
Assistant Examiner—George Manuel
Attorney, Agent, or Firm—Stevens, Davis, Miller & Mosher

[57] ABSTRACT

A beam former for a ultrasonic diagnostic apparatus is arranged to have low-bit analog-to-digital converters and enables to obtain an excellent echo signal from blood flow. The beam former further includes a sample and hold circuit for sampling an echo signal of a pulse reflected from the inside of a human body. A delaying circuit serves to delay the output of the sample and hold circuit by a delay time corresponding to an integer multiple of a transmitted pulse period and is subtracted from the output of the sample and hold circuit. The subtracted output is analog-to-digital converted and is stored in a memory. The memory reads out the data asynchronously with the storage. The delaying circuit is composed of an analog-to-digital converter, a memory and a digital-to-analog converter and has a delay time corresponding to an integer multiple of the transmitted pulse period.

14 Claims, 6 Drawing Sheets

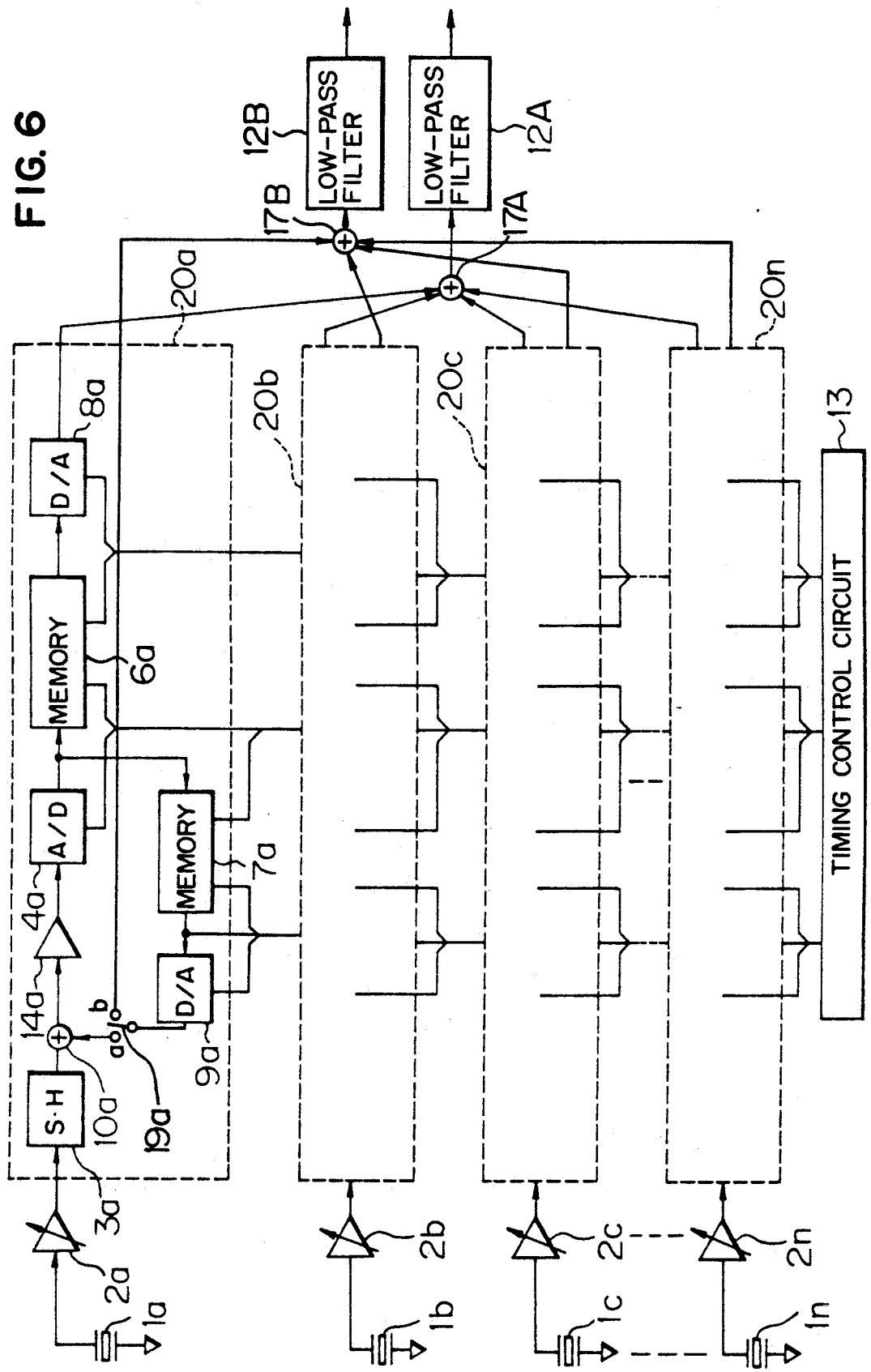

BEAM FORMER FOR ULTRASONIC DIAGNOSTIC APPARATUS

BACKGROUND OF THE INVENTION

The present invention relates to a beam former for a ultrasonic diagnostic apparatus which is used for detecting information about the inside of a human body in a medical field.

In general, a ultrasonic diagnostic apparatus normally uses a beam former which operates to take the steps of sensing echo signals from a plurality of elements, multiplying each echo signal by each delay derived from a distance from the corresponding element and adding those echo signals for improving an S/N ratio. The method employed in the beam former is known by the ordinary persons skilled in this art.

As a delay means for the beam former, an LC analog delay line is often used. The analog delay line is limited in light of the frequency characteristics and is so disadvantageous when a long delay time is needed in a high frequency. Further, the analog delay line is also disadvantageous in that the delay times in respective delay lines and between taps are variable and a dynamic focusing operation needs an analog switch, thereby bringing about noises.

To overcome those disadvantages, a beam former using digital delay lines is considered. It is arranged to have an analog-to-digital converter and a memory. For example, a technique has been proposed in "PROCEEDINGS OF THE IEEE, Vol. 65, June 1977, page 898 to 904". FIG. 1 shows one prior art of a beam former using the digital delay line. In FIG. 1, numerals 101a, 101b, 101c, ..., 101c denote elements. Numerals 102a, 102b, 102c, ..., 102n denote variable gain amplifiers. Numerals 103a, 103b, 103c, ..., 103n denote analog-to-digital converters. Numerals 104a, 104b, 104c, .., ., 104n denote memories (each being simply referred to as memory) which can execute write and read in a simultaneous and asynchronous manner. Numerals 105a, 105b, 105c, ..., 105n denote digital-to-analog converters. A numeral 106 denotes a timing control circuit. A numeral 107 denotes an analog adder. A numeral 108 denotes a low-pass filter. Hereafter, the description will be oriented to how this type of beam former operates.

An electric pulse, which is produced by a pulse generator (not shown), is applied to the elements 101a, 101b, 101c, ..., 101n in which it is converted into ultrasonic sounds. Those elements radiate the ultrasounds toward the inside of a human body. The radiated ultrasounds are reflected on various parts of the human body having respective acoustic impedances and returned to the elements 101a, 101b, 101c, ..., 101n. Those elements convert the reflected ultrasonic sounds into the corresponding electric echo signals. Those echo signals are properly amplified in the corresponding variable gain amplifiers 102a, 102b, 102c, ..., 103n and then converted into digital signals in the corresponding analog-to-digital converters 103a, 103b, 103c, ..., 103n. The digitized echo signals are written in the memories 104a, 104b, 104c, ..., 104n. Since those memories enable to read and write data simultaneously and asynchronously, they are reading out those signals as they are writing the signals. The signals read out by the memories are sent to the digital-to-analog converters 105a, 105b, 105c, ..., 105n, from which the converted analog signals are output. As such, the delay time can be arbitrarily controlled in accordance with the operation of the timing control circuit 106 which controls conversion timings of the analog-to-digital converters and the digital-to-analog converters. In the above-mentioned operation, the echo signals provided by the elements 101a, 101b, 101c, ..., 101n are respectively delayed. The respective delayed signals are added in the analog adder 107. The output of the analog adder 107 is arranged to pass through a low-pass filter 108 so as to cut from harmonics components generated by the conversion of the analog signals to the digital signals executed in the analog-to-digital converters 103a, 103b, 103c, ..., 103n.

FIG. 2 shows another prior art of a beam former using the digital delay line. In FIG. 2, numerals 101a, 101b, 101c, ..., 101n denote elements, Numerals 102a, 102b, 102c, ..., 102n denote variable gain amplifiers. Numerals 103a, 103b, 103c, ..., 103c denote analog-to-digital converters. Numerals 104a, 104b, 104c, ..., 104n denote memories which can read and write data simultaneously and asynchronously. Numerals 115a, 115b, 115c, ..., 115p denote digital adders. A numeral 106 denotes a timing control circuit. Those digital adders 115a, 115b, ..., 115p are arranged in a so-called "tournament" format. Unlike the above-mentioned prior art, this beam former is arranged to add the digital signals by using the digital adders without having to use the digital-to-analog converters.

The echoes are reflected from various tissues of a human body. Hence, those echoes are respective in intensity. For example, the echo reflected from the diaphragmata is relatively strong, while the echo reflected from blood flow is relatively weak. Considering those various echoes, a Doppler blood flow meter, for example, needs to secure such a large dynamic range as receiving the weak echo from blood flow without having to saturate the strong echo. For securing a wider dynamic range, the digital beam former needs analog-to-digital converters having more bits to be processed. Unfortunately, however, as the number of bits processed in the analog-to-digital converter is increased, the converter becomes more costly.

The cost of the digital beam former for the ultrasonic diagnostic apparatus depends on the cost of the used analog-to-digital converters. Those converters, in general, operate in the range of several MHz to several tens MHz and process 8- to 12-bit data. Such a digital-to-analog converter may often be made several to several tens times more costly even if the number of bits processed therein is increased by only one. That is, rather than increasing the bits to be processed in the converter by one, the addition of one same converter lowers the cost of the digital beam former.

SUMMARY OF THE INVENTION

It is an object of the present invention to provide an inexpensive beam former for a ultrasonic diagnostic apparatus.

It is another object of the present invention to provide a beam former for a ultrasonic diagnostic apparatus which is capable of securing a wide dynamic range.

In carrying out the object, a beam former according to the present invention provides a subtracter between a sample and hold circuit and an analog-to-digital converter in a delay circuit block for obtaining a difference between an output of the sample and hold circuit and a delay circuit having a delay time being an integer time(s) as long as a time width from a transmitted pulse to the next pulse or several times of this, the delay circuit being arranged to have a second analog-to-digital converter, a second memory, and a second digital-to-analog converter.

According to the invention, by providing a plurality of low-bit analog-to-digital converters, it is possible to eliminate an adverse effect of a strong echo from some parts such as a blood vessel wall and obtain a weak echo signal from blood flow, for example.

The beam former according to the invention has two systems each composed of a sample and hold circuit, an analog-to-digital converter, a memory, and a digital-to-analog converter in a delay block and further provides a switch for obtaining a difference between an output of the sample and hold circuit in the first system and an output of the digital-to-analog converter of the first system and applying the different into the analog-to-digital converter of the second system.

According to the invention, therefore, by providing a plurality of low-bit analog-to-digital converters, it is possible to eliminate the adverse effect of a strong echo from the blood vessel wall and thereby obtain a weak echo from blood flow. Hence, the beam former of this invention is inexpensive and provides an image formed at a high frame rate and in a dual beam manner without having to change circuit arrangement by turning on and from a switch.

BRIEF DESCRIPTION OF THE DRAWINGS

FIG. 6 is a block diagram showing a beam former according to a fourth embodiment of the invention.

DESCRIPTION OF THE PREFERRED EMBODIMENTS

Figure 3:
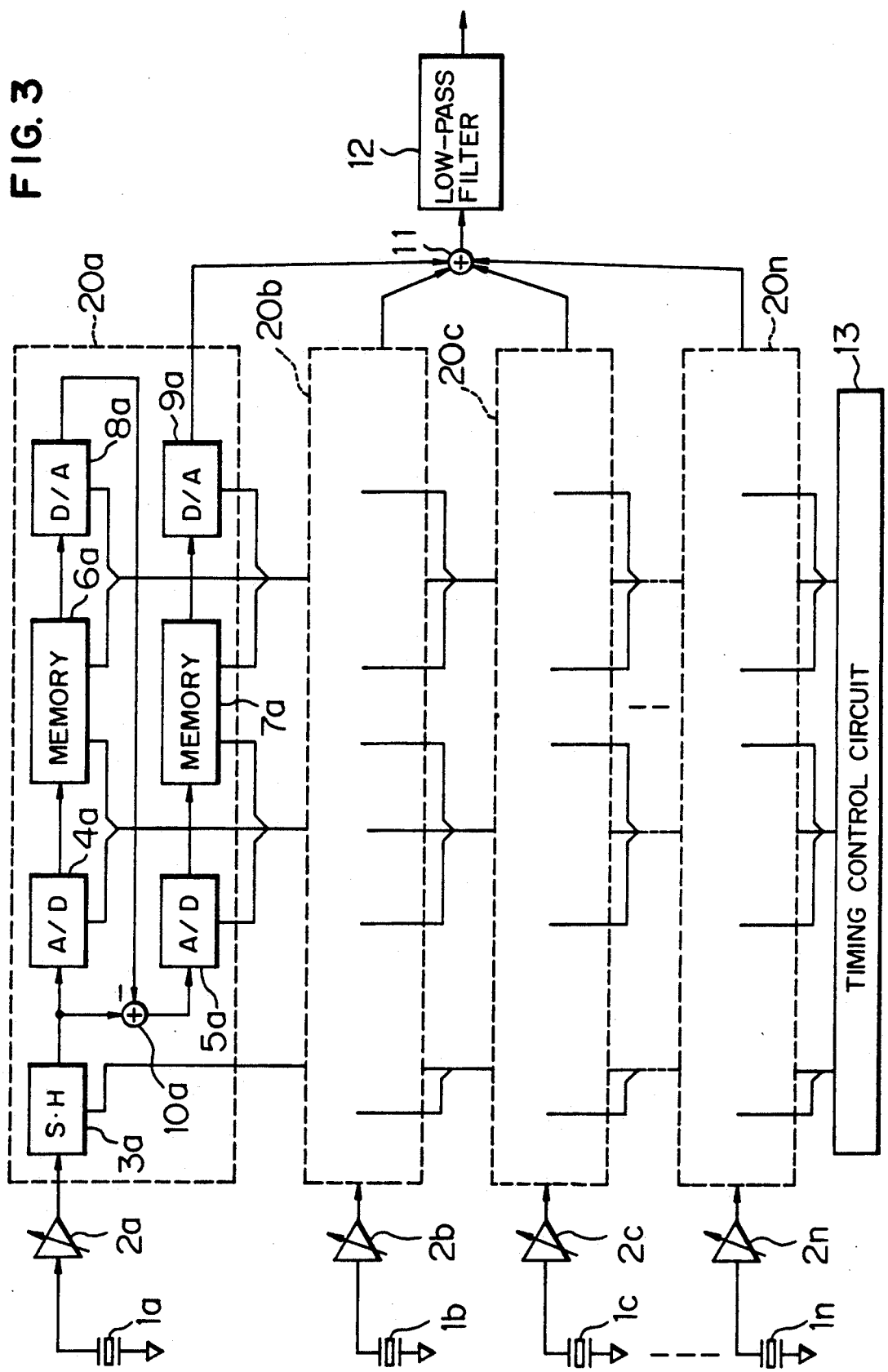
FIG. 3 is a block diagram showing a beam former according to a first embodiment of the invention.

FIG. 3 is a block diagram showing a beam former for a ultrasonic diagnostic apparatus according to a first embodiment of the invention. In FIG. 3, numerals $1a$, $1b$, $1c$, ..., $1n$ denote probe elements. Numerals $2a$, $2b$, $2c$, ..., $2n$ denote variable gain amplifiers. A numeral 12 denotes a low-pass filter. Numerals $20a$, $20b$, $20c$, ..., $20n$ denote a delay circuit block. A numeral 11 denotes an analog adder. A numeral 12 denotes a low-pass filter. The contents of all the delay circuits $20a$, $20b$, $20c$, ..., $20n$ are the same with one another. In the delay circuit block $20a$, a numeral $3a$ denotes a sample and hold circuit. Numerals $4a$ and $5a$ denote analog-to-digital converters. Numerals $6a$ and $7a$ denote memories which can read and write data simultaneously and asynchronously. Numerals $8a$ and $9a$ denote digital-to-analog converters. A numeral 13 denotes a timing control circuit for controlling conversion timings of the analog-to-digital converters and the digital-to-analog converters and the write/read timing of each memory.

Next, the description will be directed to how the beam former operates. At first, in response to the first transmitted pulse echo, the analog-to-digital converter $5a$, the memory $7a$ and the digital-to-analog converters $8a$, $9a$ do not operate. Hence, an echo signal obtained by the element $1a$ is amplified into a proper magnitude through the effect of the variable gain amplifier $2a$. Then, the amplified signal is sampled in the sample and hold circuit $3a$ and then is converted into a digital signal in the analog-to-digital converter $4a$. Then, the digital signal is stored in the memory $6a$.

In response to a second or later transmitted pulse, all the circuits are operated. With respect to the echo of the second transmitted pulse, against the signal from the element $1a$, the variable gain amplifier $2a$, the sample and hold circuit $3a$, the analog-to-digital converter $4a$ and the memory $6a$ are operated in the same manner as those circuits are operated against the echo of the first transmitted pulse. At a time, the memory $6a$ operates to read out the data about the echo of the first transmitted pulse. The readout data has the same depth as the second echo. The data read out of the memory $6a$ is applied into the digital-to-analog converter $8a$ in which the digital data is converted into an analog signal. The analog signal is applied into one input of an analog subtracter $10a$ and the output of the sample and hold circuit $3a$ is applied to the other input of the analog subtracter $10a$. The data about the echo of the first transmitted pulse is subtracted from the data about the echo of the second transmitted pulse on the same level. Since the echo from the blood vessel wall hardly changes from the first to the second transmitted pulses, the difference between those pulses is so small that the magnitude of reduction is made larger. Since the echo from the blood flow greatly changes from the first to the second transmitted pulses, the difference between those pulses is so large that the magnitude of reduction is made smaller. Hence, from the output of the analog subtracter $10a$, the low amplitude echo from the blood flow can be extracted by attenuating the high amplitude echo from the blood vessel wall. The output of the analog subtracter $10a$ is converted into a digital signal in the analog-to-digital converter $5a$ and then is temporarily stored in the memory $7a$. Then, the signal is converted into an analog signal in the digital-to-analog converter $9a$. The analog signal is added to the signal from the other elements in the analog adder 11. The harmonics components are cut from the added signal through the effect of the low-pass filter 12.

As described above, according to the first embodiment, the analog-to-digital converter 4 operates to code a signal and then the digital-to-analog converter 8 converts the coded signal into an analog signal. In the analog subtracter 10, the amount of the input signal is subtracted from the analog amount of the signal from the digital-to-analog converter 8. The difference is quantized in the analog-to-digital converter 5. Hence, the low-bit analog-to-digital converter may provide the same dynamic range as the high-bit analog-to-digital converter.

The foregoing description about the first embodiment has concerned with how a ultrasonic pulse Doppler blood flow meter extracts an echo from blood flow. This invention is also effective to the ultrasonic blood flow imaging system arranged on the same principle. In addition, the system according to this embodiment has been arranged to add analog delay signals. It goes without saying that the digital data may be used for the addition.

Figure 1:
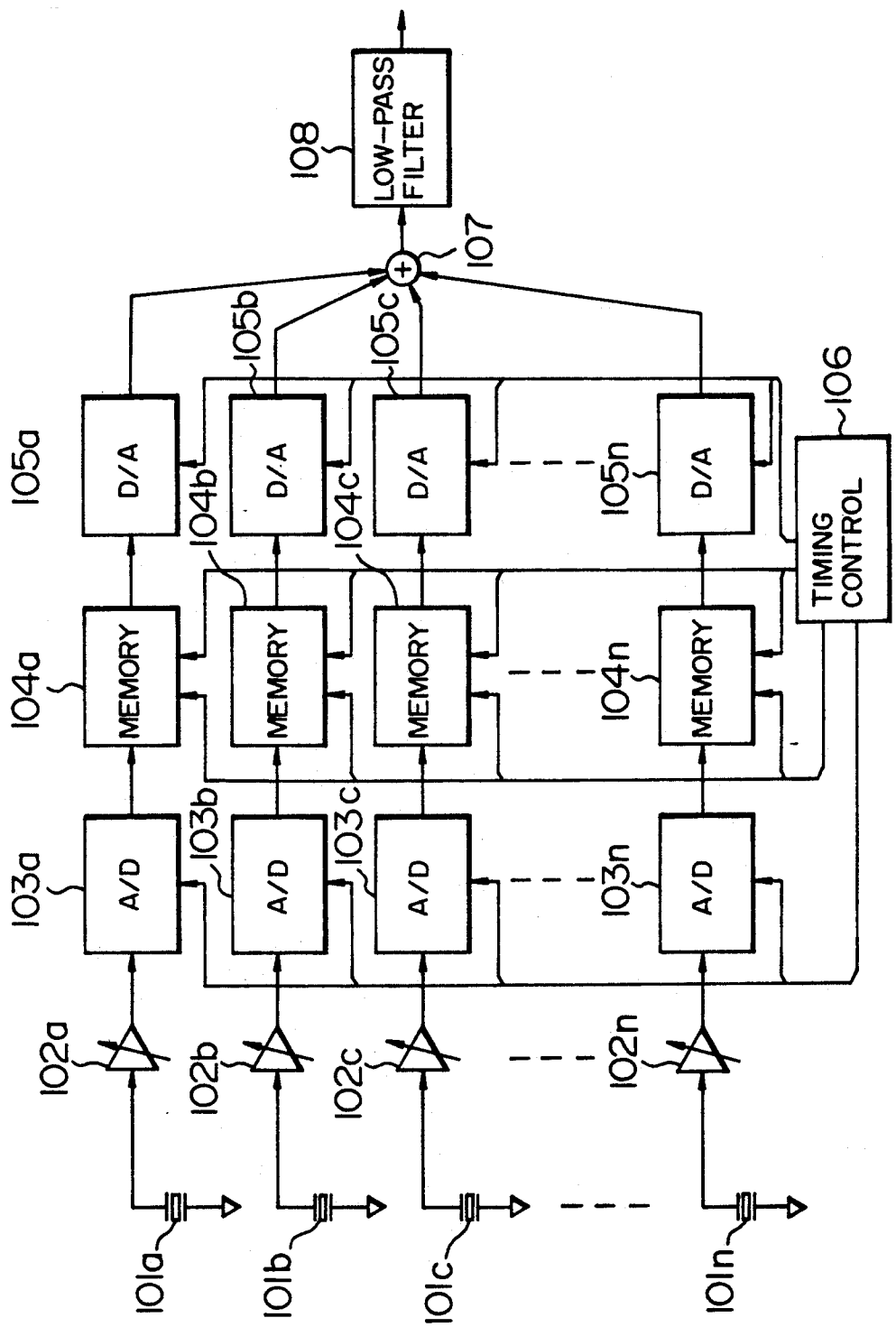
FIG. 1 is a block diagram showing a conventional beam former for a ultrasonic diagnostic apparatus.
Figure 2:
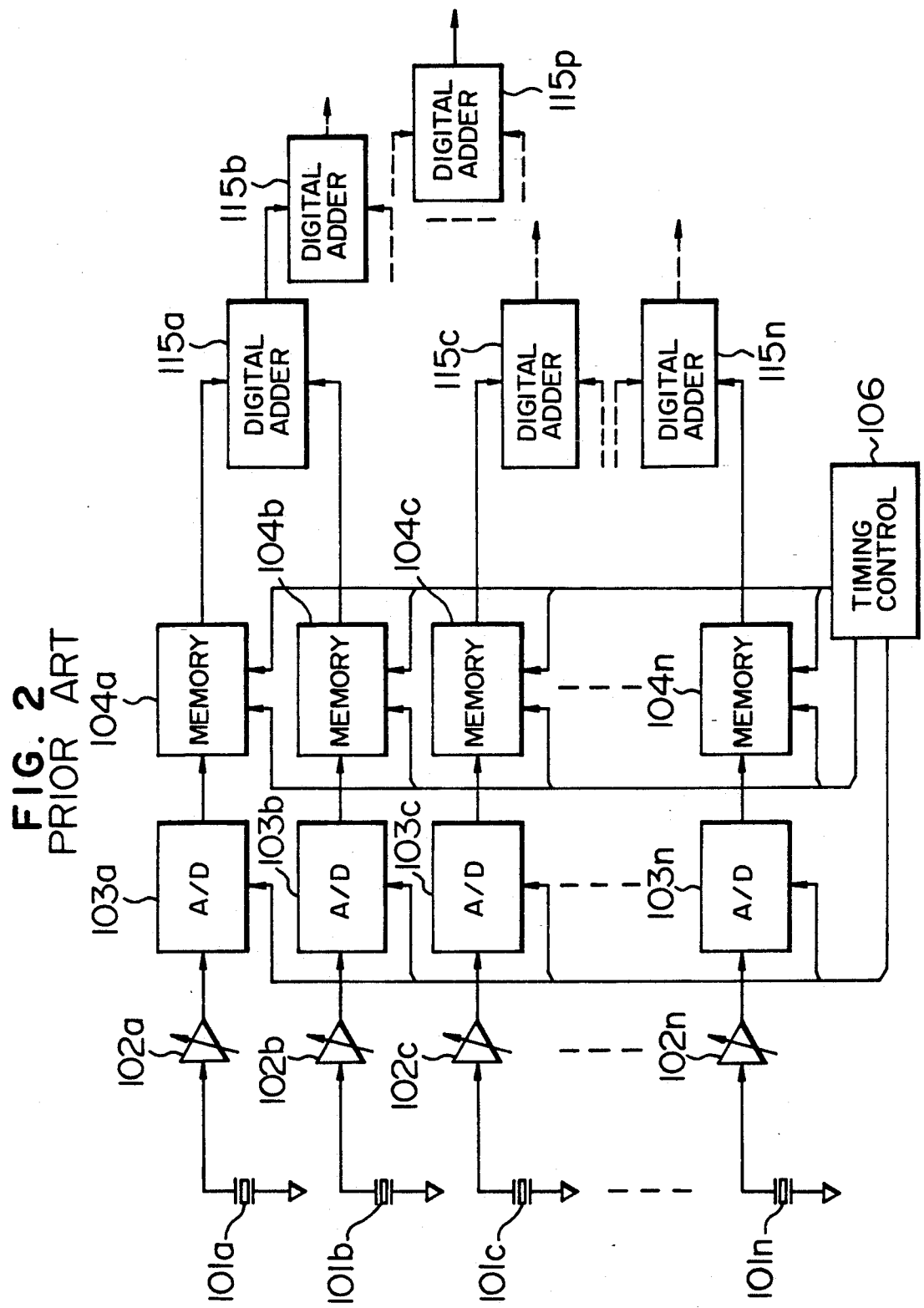
FIG. 2 is a block diagram showing another conventional beam former for a ultrasonic diagnostic apparatus.
Figure 4:
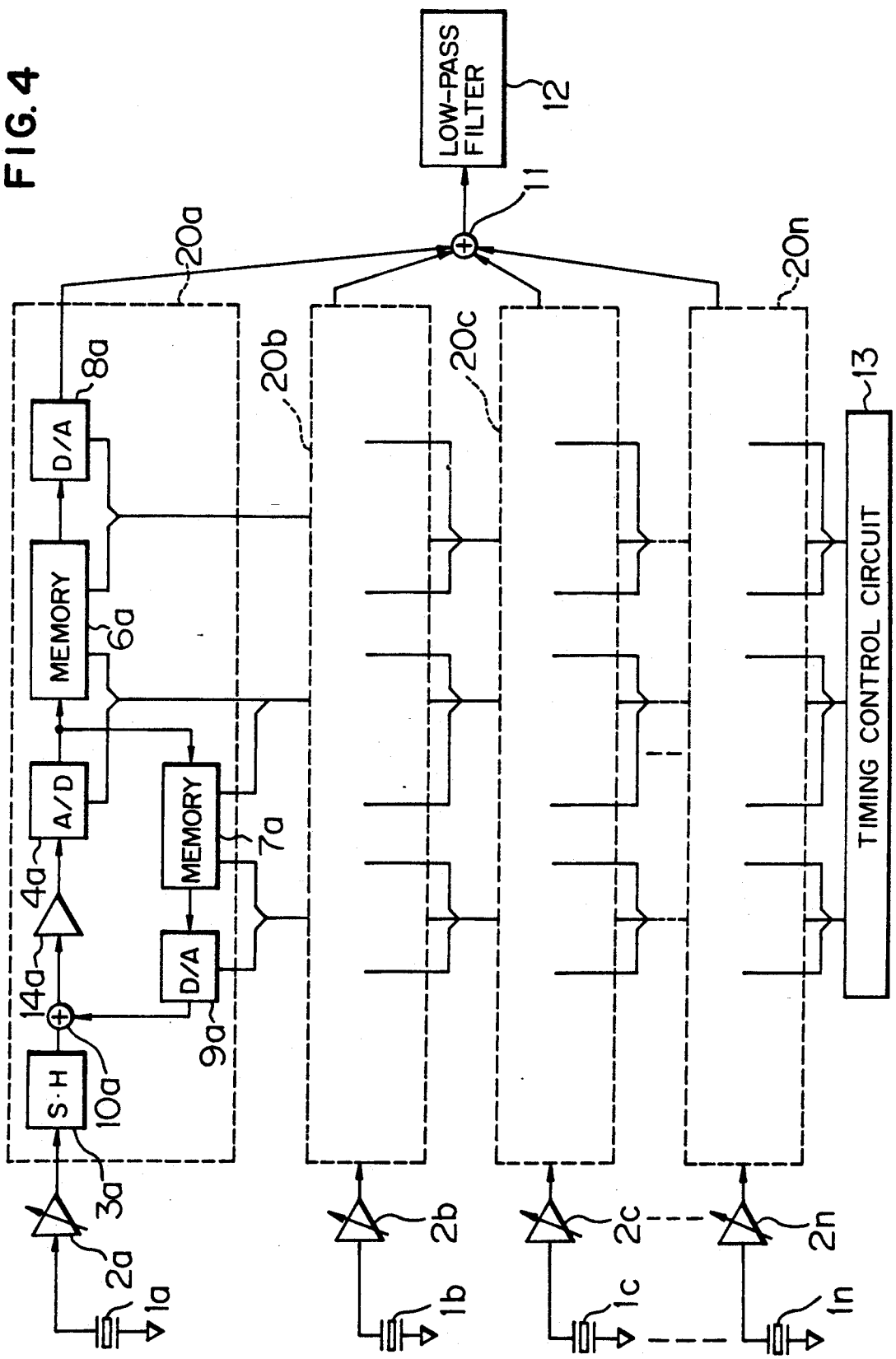
FIG. 4 is a block diagram showing a beam former according to a second embodiment of the invention.

FIG. 4 is a block diagram showing a beam former according to the second embodiment of the invention. This beam former provides an addition of an amplifier for meeting the conditions for stabilizing the system to the first embodiment shown in FIG. 1. As another different respect from the first embodiment, the output of the analog-to-digital converter 4a is fed back to the analog converter 10a through the digital-to-analog converter 9a. This feedback circuit operates as a kind of an IIR filter. The other components of this embodiment are the same as those of the first embodiment.

Now, the description will be oriented to how the delay circuit block 20a operates. The block 20a is different from those of the foregoing prior arts. The block 20a includes a feedback circuit for feeding an output of the analog-to-digital converter 4a to the analog adder 4a through the memory 7a and the digital-to-analog converter 9a. In the beginning, the description will be oriented to the operation of the block except this feedback circuit.

The echo signal derived at the element 1a is sent to the sample and hold circuit 3a through the gain variable amplifier 2a so that the echo signal may be sampled in the sample and hold circuit 3a. The output of the sample and hold circuit 3a is applied into the analog adder 10a. In this time, since the digital-to-analog converter 9a remains inoperative, no input is applied from the digital-to-analog converter 9a to the analog adder 10a. That is, the output of the adder 10a is equivalent to the input from the sample and hold circuit 3a. This output is multiplied by k in the amplifier 14a. Then, the k-folded signal is converted into a digital signal in the analog-to-digital converter 4a. The digitized signal is stored in the memory 6a from which the signal is read out in a manner to suit to a proper delay time. Then, the signal is converted into an analog signal in the digital-to-analog converter 8a.

In turn, the description will be oriented to how the beam former operates if the feedback circuit is operative. The output of the analog-to-digital converter 4a is applied into the memory 5a as well as the memory 6a. The memory 6a is used for delaying a signal. The amount of delay is equivalent to a period between one transmitted pulse and the next pulse or an integer multiple of the period. After the signal is delayed by the amount, the signal is converted into an analog signal in the digital-to-analog converter 9a and then is applied into the adder 10a.

The Doppler blood flow meter does not need to change the location of its beam unlike the B-mode scan. It means that the two inputs to the adder 10a is two echo signals of respective transmitted pulses from the same part of an organism. That is, this feedback makes contribution to enhance attenuation of the echo signal reflected from a less variable organic part such as a blood vessel wall and to lower attenuation of the echo signal reflected from a more variable organic part such as blood flow. This makes it possible to attenuate a high amplitude echo reflected from the blood vessel wall and thereby to extract a low amplitude echo reflected from blood flow.

As described above, the beam former according to the second embodiment is arranged to feed back a signal through the memory 7a and the digital-to-analog converter 9a. The use of a low-bit analog-to-digital converter, therefore, makes it possible to expand a dynamic range like the high-bit analog-to-digital converter. This results in being able to attenuate a high amplitude echo from the blood vessel wall and thereby extract a low amplitude echo from the blood flow.

The foregoing description about the second embodiment has concerned with the extraction of an echo from the blood flow by using the ultrasonic pulse Doppler blood flow meter. It goes without saying that this invention is effective to the ultrasonic blood flow imaging system based on the same principle. Further, in the description, the delayed signals are converted into analog signals before adding them. It is obvious that the digital signals may be added to each other.

Figure 5:
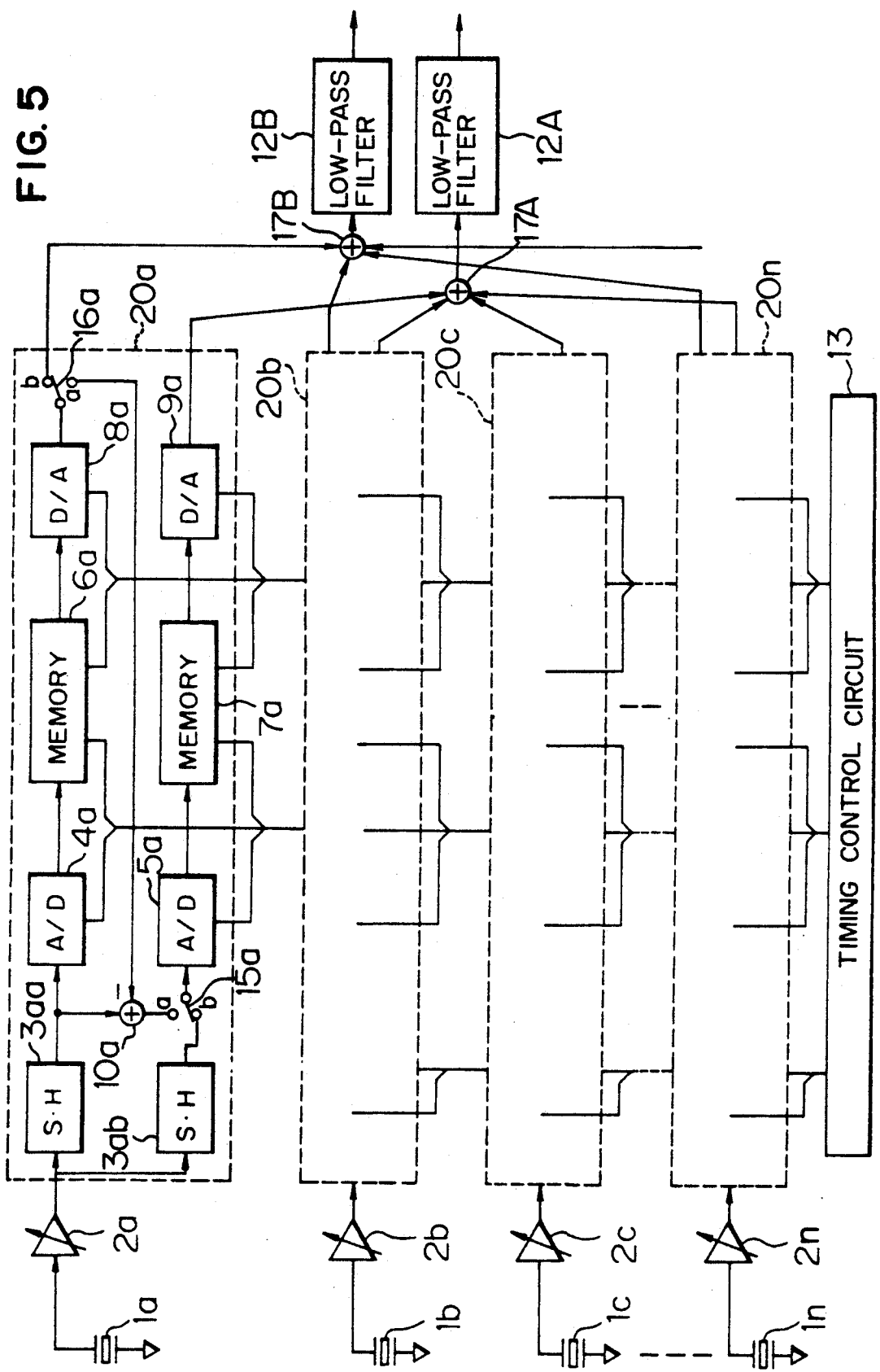
FIG. 5 is a block diagram showing a beam former according to a third embodiment of the invention.

FIG. 5 is a block diagram showing a beam former according to a third embodiment of the invention. The beam former is arranged to add an analog switch and a function of receiving a dual beam to the arrangement of the first arrangement. The function of receiving the dual beam means receiving two slightly shifted signals from one pulse radiated to the human body. More concretely, the dual beam receiving system is arranged to prepare two-system beam formers for one combination of elements, set delay times for the two beam formers whose axes of sound are slightly shifted against one transmitted pulse and obtain the data equivalent to that obtained by the ordinary two scanning for the purpose of doubling a frame rate.

The different respect of the third embodiment from the first embodiment will be described below. In FIG. 5, numerals 3aa and 3ab denote sample and hold circuits. Numerals 12A and 12B denote low-pass filters. Numerals 15a and 16a denote analog switches. Numerals 17A and 17B denote analog adders.

At first, the description will be oriented to how the beam former operates at a dual-beamer mode. At this mode, the analog switches 15a and 16a are both connected to the b sides. As such, the components on the signal path after the sample and hold circuits 3aa and 3ab are completely divided into two systems, each of which is controlled by the timing control circuit 13.

Then, the description will be oriented to how the beam former operates when the Doppler blood flow meter is operative. In this time, the analog switches 15a and 16a are both connected to the a side. The analog-to-digital converter 4a, the memory 6a and the digital-to-analog converter 8a compose a delay circuit. The delay circuit sets a delay time as one period or an integer multiple of a period of a transmitted pulse. This makes it possible to detect a minute echo from the blood flow among the strong echoes from various organic parts.

As described above, according to the third embodiment, the echo signal is converted into a digital signal in the analog-to-digital converter 4 and then is returned into the analog signal in the digital-to-analog converter 8. Then, the analog signal is applied to the analog subtracter 10 so that it is substrated from the input echo signal. The difference output from the analog subtracter 10 is quantized in the analog-to-digital converter 5. As such, the use of a low-bit analog-to-digital digital converter makes it possible to provide the same wide dynamic range as the use of a high-bit analog-to-digital converter. Further, this embodiment provides the analog switches for operating the beam former at a dual-beamer mode.

The foregoing description about the third embodiment has concerned with the extraction of an echo from blood flow by using the ultrasonic pulse Doppler blood flow meter. It goes without saying that this embodiment is effective to the ultrasonic blood flow imaging system based on the same principle.

FIG. 6 is a block diagram showing a beam former according to a fourth embodiment of the invention. The beam former of this embodiment adds an analog switch 19a to the second embodiment shown in FIG. 4. It is arranged to apply the outputs of the digital-to-analog converter 8a and the analog switch 19a into the inputs of the analog adders 17A and 17B and output the added results of the analog adders 17A and 17B through the low-pass filters 12A and 12B, respectively.

At first, the description will be oriented to how the beam former operates at a dual beam former mode. At this mode, the analog switch 19a is connected on the b side. Hence, the components on the signal flow after the memory are completely divided into two systems, each of which is controlled by the timing control circuit 13.

At first, the description will be oriented to how the beam former operates when the Doppler blood flow meter is operative. At this time, the analog switch 19a is connected to the a side. The delay circuit composed of the memory 7a and the digital-to-analog converter 9a sets a delay time as an integer multiple of a period of a transmitted pulse. This, therefore, makes it possible to detect a minute echo from blood flow among the strong echoes from variable organic parts.

As described above, according to the fourth embodiment, the delay circuit serves to delay an analog signal by an integer multiple of a period of a transmitted pulse. The delayed analog signal is fed back to the output of the sample and hold circuit 3a. Hence, the use of the low-bit analog-to-digital converter makes it possible to expand the dynamic range. Further, this embodiment provides an analog switch 19a for operating the beam former as a dual beam former.

Moreover, the use of the inexpensive low-bit analog-to-digital converter makes it possible to obtain a blood flow signal without having to be adversely effected by the strong echo from the blood vessel wall. This results in implementing an inexpensive ultrasonic diagnostic apparatus. In addition, by switching an analog switch, the dual beam former can be realized without having to substantially change circuit arrangement.

What is claimed is:

1. A beam former for a ultrasonic diagnostic apparatus comprising a plurality of delaying circuit blocks, each block having:
    a sample and hold circuit for sampling an echo signal reflected from the inside of a human body;
    an analog-to-digital converter for performing analog-to-digital conversion about an output from said sample and hold circuit;
    a memory for storing an output from said analog-to-digital converter and reading out data asynchronously with the storage;
    an digital-to-analog converter for performing digital-to-analog conversion about an output of said memory;
    a feedback circuit for delaying an output of said sample and hold circuit by a delay time corresponding to an integer multiple of a transmitted pulse period;
    a subtracter for subtracting an output of said feedback circuit from the output of said sample and hold circuit.

2. A beam former for a ultrasonic diagnostic apparatus as claimed in claim 1, further comprising an adder for adding outputs of said plurality of delaying circuit blocks.

3. A beam former for a ultrasonic diagnostic apparatus as claimed in claim 2 further comprising a low-pass filter for restricting a frequency of an output of said adder.

4. A beam former for a ultrasonic diagnostic apparatus comprising a plurality of delaying circuit blocks, each of said blocks having:
    a sample and hold circuit for sampling an echo signal from the inside of a human body;
    an analog-to-digital converter for performing analog-to-digital conversion about an output of said sample and hold circuit;
    a memory for storing an output of said analog-to-digital converter and reading out data asynchronously;
    a digital-to-analog converter for performing digital-to-analog conversion about an output of said memory;
    a delay circuit for feedback an output of said analog-to-digital converter by a delay time corresponding to an integer multiple of a transmitted pulse period;
    a subtracter for subtracting an output of said feedback circuit from an output of said sample and hold circuit;
    an amplifier for amplifying the output of said subtracter and applying an amplified output into said analog-to-digital converter.

5. A beam former for a ultrasonic diagnostic apparatus as claimed in claim 4, further comprising an adder for adding outputs of said plurality of delaying circuit blocks.

6. A beam former for a ultrasonic diagnostic apparatus as claimed in claim 5 further comprising low-pass filter for restricting the frequency of an output of said adder.

7. A beam former for a ultrasonic diagnostic apparatus comprising a plurality of delaying circuit blocks, each block having:
    a first sample and hold circuit for sampling an echo signal from the inside of a human body;
    a first analog-to-digital converter for performing analog-to-digital conversion about an output of said first sample and hold circuit;
    a first memory for storing an output of said first analog-to-digital converter and reading out data asynchronously with the storage;
    a first digital-to-analog converter for performing digital-to-analog conversion about the output of said first memory;
    a first switch for dividing an output of said first digital-to-analog converter into two ways;
    a subtracter for subtracting one output of said first switch from the output of said sample and hold circuit;
    a second sample and hold circuit for sampling an echo signal from the inside of a human body;
    a second switch for selecting one of an output of said subtracter and an output of said second sample and hold circuit and outputting the selected one;
    a second analog-to-digital converter for performing analog-to-digital conversion about an output of said second switch;
    a second memory for storing an output of said second analog-to-digital converter and reading out data asynchronously with the storage;
    a second digital-to-analog converter for performing digital-to-analog conversion about an output of said second memory;
    the other output of said first switch being supplied as an output of a first circuit, and the output of said second digital-to-analog converter being supplied as an output of a second circuit.

8. A beam former for a ultrasonic diagnostic apparatus as claimed in claim 7, further comprising an amplifier located before said first and second sample and hold circuit and for amplifying the echo signal from the inside of a human body into a predetermined magnitude.

9. A beam former for a ultrasonic diagnostic apparatus as claimed in claim 7, further comprising a first adder for adding outputs of a plurality of said first circuits and a second adder for adding outputs of a plurality of said second circuits.

10. A beam former for a ultrasonic diagnostic apparatus as claimed in claim 9, further comprising a first low-pass filter for restricting a frequency of an output of said first adder and a second low-pass filter for restricting a frequency of an output of said second adder.

11. A beam former for a ultrasonic diagnostic apparatus comprising a plurality of delaying circuit blocks, each block having:
 a sample and hold circuit for sampling an echo signal from the inside of a human body;
 an analog-to-digital converter for performing analog-to-digital conversion about an output of said sample and hold circuit;
 a first memory for storing an output of said analog-to-digital converter and reading out data asynchronously with the storage;
 a first digital-to-analog converter for performing digital-to-analog conversion about an output of said first memory;
 a second memory for storing an output of said analog-to-digital converter and reading out data asynchronously with the storage;
 a second digital-to-analog converter for performing digital-to-analog conversion about an output of said second memory;
 a switch for dividing an output of said second digital-to-analog converter into two ways;
 a subtracter for subtracting one output of said switch from the output of said sample and hold circuit;
 the output of said second digital-to-analog converter being supplied as an output of a first circuit and the other output of said switch being supplied as an output of a second circuit.

12. A beam former for a ultrasonic diagnostic apparatus as claimed in claim 11, further comprising an amplifier for amplifying an echo signal from the inside of a human body into a predetermined magnitude and supplying an amplified output to said sample and hold circuit.

13. A beam former for a ultrasonic diagnostic apparatus as claimed in claim 11 further comprising a first adder for adding outputs of a plurality of first circuits and a second adder for adding outputs of a plurality of second circuits.

14. A beam former for a ultrasonic diagnostic apparatus as claimed in claim 13 further comprising a first low-pass filter for restricting a frequency of an output of said first adder and a second low-pass filter for restricting a frequency of an output of said second adder.

* * * * *